United States Patent [19]

Marquisee

[11] 4,232,126
[45] Nov. 4, 1980

[54] NONTACKY SHAPED OBJECTS FROM POLYMER LATICES

[75] Inventor: Mark J. Marquisee, Landenberg, Pa.

[73] Assignee: E. I. Du Pont de Nemours and Company, Wilmington, Del.

[21] Appl. No.: 971,687

[22] Filed: Dec. 18, 1978

Related U.S. Application Data

[60] Division of Ser. No. 838,365, Sep. 30, 1977, which is a continuation-in-part of Ser. No. 700,965, Jun. 29, 1976, abandoned.

[51] Int. Cl.$^2$ ............................ C08J 9/00; B01J 13/00
[52] U.S. Cl. ........................................ 521/65; 521/71; 521/72; 106/286.1; 106/286.4; 106/287.17; 106/287.34; 252/313 R; 252/313 S
[58] Field of Search ..................... 252/313 R, 313 S; 106/286.1, 286.4, 287.17, 287.34; 521/65, 71, 72; 260/DIG. 22

[56] References Cited

U.S. PATENT DOCUMENTS

| | | | |
|---|---|---|---|
| 2,459,748 | 1/1949 | Johnson | 260/DIG. 22 |
| 2,574,902 | 5/1951 | Bechtold et al. | 252/313 S |
| 2,590,833 | 4/1952 | Bechtold et al. | 252/310 |
| 3,007,878 | 11/1961 | Alexander et al. | 252/313 S |
| 3,053,824 | 9/1962 | Heinz | 528/485 |
| 3,252,917 | 5/1966 | Mindick et al. | 212/313 S |
| 3,745,126 | 7/1973 | Moore | 252/313 R |
| 3,846,365 | 11/1974 | Berg et al. | 260/33.6 AQ |

FOREIGN PATENT DOCUMENTS

1065736  4/1967  United Kingdom .

Primary Examiner—William R. Dixon, Jr.

[57] ABSTRACT

Nontacky, elastomeric shaped objects (e.g., pellets or filaments) comprising a normally tacky, uncured elastomer having an integral, porous coating of silicic or aluminic acid polymer can be prepared by bringing shaped bodies of a normally tacky, uncured elastomer latex into contact with an aqueous bath containing a soluble coagulating salt for the latex, and a silicic or aluminic acid polymer, and washing and drying the resulting coated shaped objects. The shaped objects are highly porous before washing and drying, and some porosity remains even after washing and drying.

20 Claims, 3 Drawing Figures

NONTACKY SHAPED OBJECTS FROM POLYMER LATICES

CROSS-REFERENCE TO RELATED APPLICATION

This is a division of my copending application Ser. No. 838,365, filed Sept. 30, 1977 which is in turn a continuation-in-part of my copending application Ser. No. 700,965, filed June 29, 1976 now abandoned.

BACKGROUND OF THE INVENTION (1) Field of the Invention

This invention is concerned with nontacky shaped objects of normally tacky elastomers, and a process for preparing them.

(2) Description of the Prior Art

It is a well known process to emulsify polymerizable monomers in water and then convert them to polymers in dispersed form. The resulting dispersions are called latices. Natural rubber also occurs as a latex. Some latices are highly useful as formed, for example, basic formulations for latex paints. For other uses, it is necessary to coagulate the polymer and separate it from the latex. The most important commercial form for these polymers is as washed and dried, nontacky shaped objects. These shaped objects should be washed until they contain less than about 3% by weight of water soluble material, and dried until they contain less than about 1% by weight of volatile material.

If the coagulated polymer is inherently nontacky, the polymer is readily isolated from the aqueous phase, washed and dried to form a free-flowing powder which is readily handled in further processing. If, however, the polymer is inherently tacky, coagulating of the latex yields the polymer in an agglomerated mass which is difficult to wash free of impurities and also difficult to dissolve, to blend with other materials, and to feed in compounding, curing and molding operations.

In the field of natural and synthetic rubber, much attention has been given to the problem of agglomeration of normally tacky polymers before curing. Some operable solutions have been found.

In U.S. Pat. No. 2,879,173, Yacoe shows a process for coagulating a polychloroprene latex by suspending drops in a volatile, water-immiscible, organic liquid in which the polychloroprene latex is insoluble while maintaining the liquid below about −20° C. until the drops are completely frozen and coagulated. The resulting frozen pellets are separated and coated, while still frozen, with from 5% to 20% by weight of an inert powder, such as talc, so that they will not stick together when thawed and dried. However, the use of this process has been limited by the cost of organic liquid recovery, the energy cost of the refrigeration, and the undesirable high loading of inert material. The need for a more practical and economical method of preparing nontacky, washed and dried shaped objects of normally tacky elastomers remains.

In U.S. Pat. No. 3,053,824, Heinz shows coagulation of a phosphate or borate buffered elastomer latex by running it into an aqueous aluminum or titanium salt solution containing also an alkali metal or alkaline earth metal salt. The patent states that the resulting coagulated particles do not stick together before being washed to remove the coagulating salts. There is no statement as to the tack of the particles after washing. Comparative Example 1(d) shows that, when $Na_4P_2O_7$ is left out of the latex, the precipitate is very sticky and after a time forms lumps. Accordingly, the nonsticky character of the product is associated with the presence of $Na_4P_2O_7$ in the latex.

In U.S. Pat. No. 3,846,365, Berg et al. show a powdery, filled polymer prepared by emulsifying together a dilute solution of an elastomer in a volatile organic solvent and a solid, finely-divided filler for the elastomer, passing the emulsion into an aqueous alkali silicate solution at a pH preferably of 7 to 12, and evaporating the organic solvent. A finely-divided, tack-free coprecipitate of the latex and silicic acid residue is formed. It is stated that condensation of the silicate anions should be avoided.

Neoprene is commercially prepared at the present time by destabilizing an aqueous chloroprene latex bath time by adding acetic acid close to the coagulation point of the latex, passing the latex to a freezing roller at −20° C. to form a film, washing the film to remove primarily sodium acetate, and drying the film at 120° C. This film, which is highly tacky, is then coated with talcum, chopped and refrigerated. Since this process involves refrigeration and coating with talcum, a less expensive procedure which requires smaller amounts of inert material would be desirable.

SUMMARY OF THE INVENTION

This invention is based on the discovery that nontacky, uncured, washed and dried, elastomeric shaped objects can be produced from a normally tacky elastomer latex by a simple and inexpensive process. This invention provides nontacky, elastomeric shaped objects which comprise a normally tacky, uncured elastomer containing, based on the total weight of the shaped object, less than about 3% by weight of water soluble material, and less than about 1% by weight of volatile material, and having about 0.05 to about 3% by weight of an integral, porous coating of a water insoluble, hydrous inorganic oxide selected from the group consisting of silicic acid polymers, aluminic acid polymers, silicic acid-aluminic acid copolymers, and mixtures thereof, said shaped objects having a minimum dimension of about 0.1 to about 10 millimeters. By "integral" is meant a coating which has unity, rather than being composed of discrete particles such as in the case of a powder coating. By "minimum dimension" is meant the diameter of the smallest round hole through which the shaped object will pass lengthwise.

A unique feature of this invention is that prior to removing the water soluble and volatile materials, the nontacky shaped objects are highly porous. This porosity is evidenced by the objects being opaque in appearance when dispersed in water, and by their cross section having a vesicular structure in micrographs. Because of this porosity, water soluble and volatile materials are easily removed by washing and drying techniques. Some of the porosity is retained even after washing and drying.

The nontacky, elastomeric shaped objects of this invention are prepared by a process which comprises bringing shaped bodies of a normally tacky, uncured elastomer latex having a solids content of 20% to 65% by weight into contact with an aqueous bath containing, based on the total weight of the bath, (a) about 0.5% to about 25% by weight of a soluble coagulating salt for the latex, and (b) about 0.01% to about 5% by weight of a soluble or colloidally dispersed, hydrous inorganic oxide selected from the group consisting of silicic acid polymers, aluminic acid polymers, silicic acid-aluminic acid copolymers, and mixtures thereof, said bath having a pH of about 2 to about 7 such that, when a drop of 1.0 N NaOH is added to the bath, the drop is immediately surrounded by a cloudy coating of gelled, hydrous inorganic oxide, thereby coagulating the latex and forming highly porous shaped objects of the coagulated elastomer coated with water insoluble, hydrous, inorganic oxide. These shaped objects can then be washed with water until the water soluble material content is less than about 3% by weight, and dried until the volatile material content is less than about 1% by weight, thereby providing free-flowing, nontacky, elastomeric shaped objects. This invention is particularly suitable for producing nontacky pellets of uncured neoprene.

The term "shaped body" is used herein to designate the latex before it contacts the aqueous bath. The term "shaped object" is used herein to designate the latex and subsequent elastomer after the shaped body enters the bath.

DESCRIPTION OF THE PREFERRED EMBODIMENTS

In accordance with this invention, an inorganic oxide polymer coating is chemically deposited on a shaped object of normally tacky elastomer from solution or dispersion in an aqueous bath. The coating, as formed, is therefore a porous, nonparticulate, unitary pellicle entirely surrounding each shaped object. Because of the integral nature of the coating, nontacky objects can be obtained with very small loadings of coating material. This is particularly important for elastomers that are subsequently dissolved before curing, and is in sharp contrast to the requisite heavy loadings of particulate materials, such as talc, which have previously been used to render uncured elastomeric objects nontacky.

The products of this invention are nontacky shaped objects of normally tacky, uncured elastomers. The term "elastomer" is well known to those skilled in the art and has been defined in publications such as "ASTM Glossary of Terms Relating to Rubber and Rubber Like Materials", page 38. By "normally tacky elastomer" is meant an elastomer, two pieces of which, when uncured and in the most decrystallized condition, will stick together at room temperature.

Suitable elastomers for use in accordance with this invention include homopolymers and copolymers of conjugated dienes such as neoprene and natural rubber; copolymers of conjugated dienes with other polymerizable, organic monomers, for example butadiene-acrylonitrile and butadiene-styrene copolymers; elastomeric fluoropolymers (fluorine-containing polymers), preferably copolymers of vinylidene fluroide and at least one other fluorine-containing monomer, for example copolymers of vinylidene fluoride and hexafluoropropene (U.S. Pat. No. 3,051,677), and terpolymers of tetrafluoroethylene, vinylidene fluoride and hexafluoropropene (U.S. Pat. No. 2,968,649); adhesive-type elastomers such as polyvinyl acetate and ethylene-vinyl acetate copolymers; acrylate rubbers such as the lower alkyl acrylate ester polymers; hydrocarbon elastomers such as polyisobutylene, the terpolymers of ethylene, propylene and nonconjugated dienes; and similar materials.

The preferred elastomer is neoprene. By "neoprene" is meant an elastomer comprising at least about 50% chloroprene (2-chloro-1,3-butadiene). Representative comonomers that can be used with chloroprene include vinyl aromatic compounds, such as styrene, the vinyl toluenes, and vinylnaphthalenes; aliphatic conjugated diolefin compounds such as 1,3-butadiene, isoprene, 2,3-dimethyl-1,3-butadiene, and 2,3-dichloro-1,3-butadiene; vinyl ethers, esters, and ketones, such as methyl vinly ether, vinyl acetate, and methyl vinyl ketone; esters, amines, and nitriles of acrylic and methacrylic acids, such as ethyl acrylate, methyl methacrylate, methacrylamide, and acrylonitrile; and the like.

Neoprene latices for use in this invention may be prepared by the known aqueous emulsion polymerization of chloroprene, using a sodium rosinate dispersant and a free-radical type polymerization catalyst such as potassium persulfate. The sodium rosinate dispersant may be prepared in situ from rosin acids and sodium hydroxide.

Additives such as fillers, antioxidants and the like may be present during the polymerization. The polymerization is allowed to proceed to a predetermined degree of completion, after which a catalyst shortstop can be added, and residual chloroprene monomer is stripped off. Minor variations in the procedure yield latices of polymers varying in molecular weight, viscosity, crystallinity, and other properties. In order to form pellets in the process of this invention, the latex should have a solids content of at least about 20% by weight. Suitable latices can have solids contents up to about 65%. Latices generally coagulate when the solids content goes above about 65%. Preferably the latex has a solids content from about 35% to about 50%.

This invention involves the process of adding drops, a controlled stream, or some other dispersed form of a latex of the normally tacky elastomer to an aqueous coagulating and coating bath thereby forming a coated shaped object. The latex emulsion should be stable enough to survive through the addition step until the shaped object is fully penetrated by the coagulating salt and any neutralizing agent present. Neoprene latices are normally stabilized against premature coalescence by sodium rosinate; natural rubber by ammonia.

The aqueous coagulating and coating bath contains a coagulating salt for the latex, that is, a salt which will coagulate the elastomer latex. Suitable coagulating salts are well known to those skilled in the art; for example, see "Neoprene Latex", by J. C. Carl, pages 19–21, published by E. I. du Pont de Nemours and Company (Inc.), Wilmington, Del. Operable salts which may be employed include the water soluble sulfates, chlorides, bromides, nitrates, citrates, acetates, formates and phosphates of ammonium, sodium, potassium, calcium, magnesium, strontium, barium, lithium, beryllium, aluminum, manganese, zinc, yttrium, iron and cadmium. Mixtures of such salts may also be used.

Desirable, but nonlimiting, characteristics of the coagulating salt include low cost, colorless solutions, cations and anions which are not readily oxidizable or reducible, noncoprecipitating with the alkali metal salt accumulating in the bath, nontoxic, and nonpolluting. Preferably, the salt should be chemically inert to the elastomer and insoluble therein. The preferred salts are soluble chlorides, sulfates, acetates, nitrates and phosphates of sodium, potassium, ammonium, calcium, magnesium and aluminum. The most preferred salts are the soluble chlorides and sulfates of the above cations. The coagulating salt may constitute from about 0.5% to about 25% by weight of the bath. The operable amount of coagulating salt within this range in any given case will depend upon the particular latex, the pH of the bath, and the particular inorganic oxide present. Generally, the optimum and preferred amount of salt is in the range of about 1% to about 10%.

The bath also contains a soluble or colloidally dispersed, hydrous inorganic oxide selected from the group consisting of silicic acid polymers, aluminic acid polymers, silicic acid-aluminic acid copolymers, and mixtures thereof. It is generally recognized that silicic acid, in freshly prepared solutions, is not monomeric, but has a molecular weight of the order of about 1000. As the silicic acid solution ages, the molecular weight continues to rise until finally the solution gels [see Bechtold, J. Phys. Chem., 59, 532–541 (1955)]. Accordingly, these inorganic oxides are commonly considered as existing in polymeric form, the structure of which may be linear chains, ribbons, or when highly cross-linked, even globules, in which atoms of the inorganic element alternate with oxygen atoms. In such polymers, some of the peripheral groups are —OH groups.

When these polymers are formed by polymerization in aqueous systems, they are initially quite soluble, but, as polymerization progresses, become insoluble yielding such forms as gels, gel particles or, if controlled nucleation is practiced, sols, i.e., dispersions of nongelatinous insoluble particles in the liquid medium. This is directly analogous to organic polymerizations in which low molecular weight oligomers are soluble in the polymerization solvent, but the growing polymer chains become insoluble as the molecular weight increases, yielding a polymer dispersion or sol.

The inorganic oxide may be used in water soluble form, as in the case of polysilicic acid and polyaluminic acid, or in more highly polymerized, particulate form as in the case of colloidally dispersible silica sols as described in U.S. Pat. No. 2,574,902, alumina sols as described in U.S. Pat. No. 2,590,833, and silica-alumina sols such as natural and synthetic clays, zeolites and glasses, sometimes referred to as polysilico-aluminates or polyalumino-silicates. In practice, most aqueous systems containing such compounds have at least part of the polymeric oxide in the form of dispersed particles.

The terms, "silicic acid polymers" and "aluminic acid polymers" are intended to include these polymers in both the soluble and the colloidally dispersible form. The inorganic oxides may be in crystalline or amorphous form, and a mixture of two or more such oxides may be used. The most preferred inorganic oxides are polysilicic acid, polyaluminic acid and silicic acid-aluminic acid copolymers.

If the coagulating salt employed is an aluminum salt and the inorganic oxide is polysilicic acid, some of the aluminic hydroxyls generated at the alkaline surface of the latex may copolymerize by condensation with silanol groups to form an aluminic acid-silicic acid copolymer. If the coagulating salt employed is not an aluminum salt, particularly if the bath is utilizing polysilicic acid as the coating material, it is desirable, though not essential, to add to the bath about 0.002% to about 2% by weight of an ionizable aluminum salt. Although copolymerization of the aluminum has not been established, it is believed that this accounts for the inorganic oxide being rendered more effective as a coating, possibly by reducing any subsequent solubility of the coating in the wash water. For this purpose, it has been found that yttrium salt are equivalent to aluminum salts and may be substituted in whole or in part therefor. Accordingly, the term "silicic acid-aluminic acid copolymer" should be construed in the claims to cover this substitution of equivalents.

When silicic acid polymer is used as the inorganic oxide, the silicic acid solution should not have aged for more than about 90% of its gel time prior to being added to the bath. Preferably, the silicic acid solution has aged for about 5% to about 70% of its gel time prior to being added to the bath. When operating in a continuous manner, silicic acid is continuously added to and removed from the bath, whereby the average age of the polysilicic acid reaches a constant value which is less than its gel time.

The hydrous inorganic oxide may constitute from about 0.01% to about 5% by weight of the coagulating bath. The presence of more than about 5% inorganic oxide does not lead to any further improvement in the nontacky properties of the product. Preferably the inorganic oxide is present in the amount of about 0.03% to about 2%. The oxide may be polymerized or crystallized during the coating operation. One criterion for determining when a bath is no longer suitable for the present process is coagulation of the bath due to changed conditions such as pH or to exhaustion of essential ingredients.

Optionally, the bath may also contain a minor amount of surfactant to reduce the air-liquid interfacial tension and assist penetration of the shaped latex body into the bath. Suitable surfactants are characterized by being effective at low concentrations and being compatible, that is, not causing polymerization or cross-linking of the hydrous oxide component, and being inert to the coagulating salt. A wide variety of nonionic, anionic, cationic and amphoteric surfactants may be used. Examples of suitable surfactants include lower alkyl alcohols such as ethanol, the trimethylnonanol ether of ethylene oxide, sodium heptadecyl sulfate, sodium lauryl sulfate, the condensation products of tertiary amines with ethylene oxide, fluorinated amphoteric surfactants, and the like. The surfactant preferably is added in an amount sufficient to reduce the air-liquid interfacial tension to less than about 50 dynes/cm and particularly less than about 35 dynes/cm.

The bath is operable in a pH range of about 2 to about 7. If the pH is below about 2, the inorganic oxide is difficult to gel on the surface of the shaped object. If the pH is above about 7, the inorganic oxide may be converted to a soluble salt. The operable pH within this range for any given system will depend on the particular latex, coagulating salt and inorganic oxide present. Within this range, pH values from about 2.5 to about 5.5 are particularly preferred for optimum balance of bath stability with coating effectiveness. If the pH of the bath is maintained in the desired range by proportional addition of a neutralizing agent as the alkaline latex bodies enter the bath, the life of the bath can be substantially prolonged. Organic and inorganic acids such as acetic acid and aqueous hydrochloric acid, and hydrolyzable acidic salts such as $AlCl_3$ are particularly suitable neutralizing agents.

Operability of the bath to provide a coating on the shaped object is a function of the amount and type of hydrous inorganic oxide present and the pH of the bath. It has been found that not all combinations of the above variables lead to operable baths. Although the requirements for a functional bath are not fully understood, a simple test has been found for determining whether the bath is functional. In this test, a drop of 1.0 N sodium hydroxide is added to the bath. If the drop is immediately surrounded by a cloudy coating of gelled hydrous oxide, the bath is functional.

Although the pH of various latices vary over wide limits, it is preferable that the pH of the latex be equal to or greater than the pH of the bath. When the latex is neoprene containing sodium rosinate as the stabilizer, the pH of the latex will be greater than about 7 unless it has been acidified.

When the latex is added as drops, the precipitated shaped objects obtained may be lumps, beads, pellets (with or without a "tail"), discs or rings depending on the surface tension and density of the precipitating bath and the speed and direction of the latex as it enters the bath. When the latex is added as a controlled stream, the stream may be filamentous, yielding a precipitated fiber or beading, or the stream may be spread out in flat or curved form yielding a precipitated ribbon, sheet or tube. Drops and controlled streams may be added either above or below the surface of the bath. Preferably the latex is added as drops above the surface of the bath.

Entry of the latex into the bath and movement of the precipitated, coated object through the bath impart to the bath a degree of agitation. Additional agitation in the form of stirring or shaking may be supplied, if desired, to assist in maintaining the uniformity of the bath. Agitation is particularly desirable when the pH of the bath is being maintained by addition of acid as noted above.

The present process may be operated at temperatures in the range from about 0° C. to about 100° C. Temperatures in the range from about 5° C. to about 70° c. are preferred, with the range from about 10° C. to about 40° C. being particularly preferred because of the improved stability of the bath in this range.

Pressure is not a critical variable in the present process and pressures both above and below atomspheric pressure are operable. Atmospheric pressure is preferred for convenience.

The time from entry of a particular elastomeric latex body into the bath until removal of the nontacky elastomeric shaped object therefrom may be varied widely, depending somewhat on the minimum dimension of the object being coated. The time may vary from about 0.5 second up to about 6 hours or more. On contact with the bath, the latex starts to coagulate and a nontacky coating is formed immediately on the surface of the coagulated shaped object, e.g., within about 0.5 to about 5 seconds. Longer retention of the coated object in the bath is employed when it is desired to complete coagulation and neutralization of the latex in the center of the coated object before it is removed from the bath. In preferred baths, this requires less than about 6 minutes. Complete coagulation in the bath is not essential since coagulant which has penetrated the shaped object can continue to migrate toward the center of the object after removal of the object from the bath. It is preferable, however, to leave the object in the bath until sufficient coagulant has penetrated the object to complete the coagulation.

Figure 1:
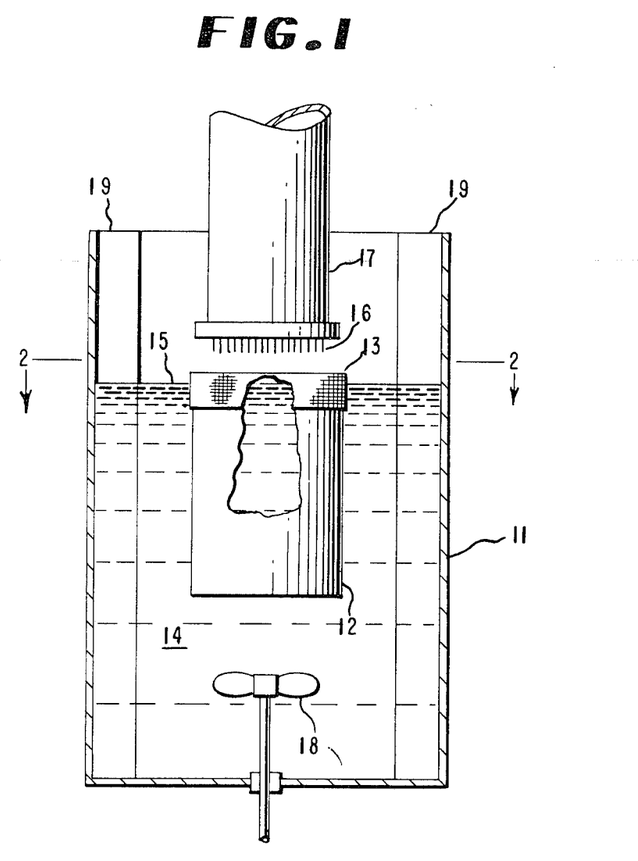
FIG. 1 illustrates a view in central vertical section and partially in side elevation of a preferred apparatus for carrying out one embodiment of the process of this invention. This apparatus and the method of using it is being claimed in an application filed by R. M. Secor on June 29, 1976.
Figure 2:
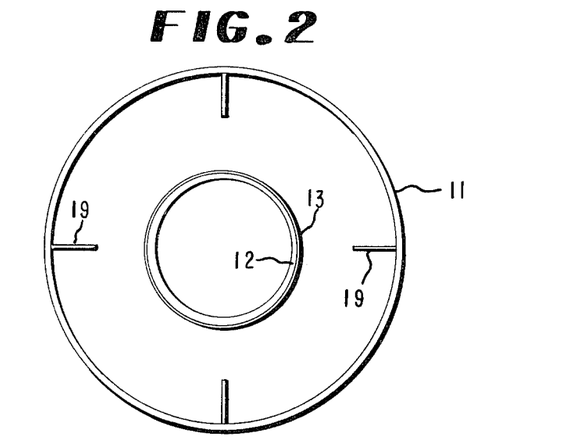
FIG. 2 illustrates a top view of the same apparatus as FIG. 1 taken through cut 2—2.

Referring now to the drawings, FIGS. 1 and 2 show a preferred embodiment of suitable apparatus for carrying out the process of this invention. This apparatus comprises a cylindrical tank 11 (27.94 cm i.d.) and a cylindrical draft tube 12 (12.7 cm i.d.) which is concentric with tank 11. The tube and tank may be constructed of any rigid material such as glass, metal, or plastic. Draft tube 12 is extended on its upper end by a wire mesh screen 13 having a mesh size smaller than the size of the shaped objects being produced. Bath 14 containing the inorganic oxide polymer and the coagulating salt is maintained at a liquid level such that the bath surface 15 is slightly below the upper edge of screen 13. Drops or discrete masses of polymer latex are introduced into the bath within the zone circumscribed by screen 13. In this embodiment, stainless steel capillary tubes 16 (1.9 cm long, 0.86 mm i.d. and 1.3 mm o.d.) are used for forming the latex drops. These tubes are mounted through polytetrafluoroethylene plugs in a stainless steel plate bolted to the lower end of pipe 17 (10.1 cm i.d.). The center-to-center distance between the tubes mounted in the plate is 1.11 cm. Sixty-one tubes are arranged in a hexagonal array with five tubes on a side. The frequency of drop addition to the bath is adjusted by varying the level of latex in pipe 17.

An agitator 18 is provided in the bottom of tank 11 to promote circulation of the bath in such a manner that flow of the bath solution is generally down through the draft tube, up through the space between the draft tube and the tank wall, and through the screen to the confined bath surface. For this purpose, a 3-lobed (15.24 cm diameter) marine propeller is used.

The screen at the top of the draft tube provides a means of passing a solution which is free of shaped objects to the top of the draft tube. It also keeps out foam produced by the agitation and helps keep the surface free of disturbances which might affect the uniformity of the shaped objects dropped through the surface. To increase agitation and thereby aid suspension of the coated latex particles in the annular space outside the draft tube, baffles 19 (3.81 cm wide) are placed vertically along the walls of tank 11 at 90° intervals. These baffles are not always necessary depending on the type of agitation used.

Through the action of the draft tube, screen, agitator and baffles, the shaped bodies contact a fresh solution, free of coated particles and foam. The shaped objects remain discrete as they pass down through the draft tube. By the time they emerge from the draft tube they are coated so that the tendency to agglomerate with previously coated shaped objects is eliminated. The coated shaped objects are then held in suspension outside of the draft tube until they are removed from the bath.

A typical batch run can be made using this apparatus as follows: First, bath 14 comprising an aqueous solution of an inorganic salt, a small amount of surfactant, and the coating material is prepared. The salt serves to coagulate the latex during coating and after it is coated.

The surfactant facilitates passage of latex drops through the surface of the bath.

Latex is added to standpipe 17 to produce a given head pressure and then continuously added to maintain this head pressure on the capillary tubes. Since no solution is withdrawn from the bath during the run, the bath level rises due to the addition of latex. Both standpipe 17 and draft tube 12 are mounted so that they can be moved vertically. They are moved during the course of each run to maintain the capillary exits about 2.54 cm above bath surface 15, and the upper edge of screen 13 about 0.835 cm above bath surface 15.

Although the apparatus illustrated in the drawings allows only batch removal of coated shaped objects at the conclusion of each run, the process can be operated continuously by providing an overflow tube in tank 11 for continuous removal of coagulated, coated shaped objects from the bath, filtering the suspension of shaped objects passing through the overflow tube, recycling the filtrate to the bath, and replacement of the bath components as they become exhausted.

A major advantage of the invention is that, when large numbers of uncured shaped objects are stored in contact with each other under ordinary conditions, they do not agglomerate, but remain readily separable and free flowing. The shaped objects have a minimum dimension of about 0.01 to about 10 millimeters. The minimum dimension should be at least about 0.01 mm to avoid dusting. Shaped objects with a minimum dimension above about 10 mm require excessive power to mix with other ingredients in use applications. Preferably the shaped objects have minimum dimensions of about 0.1 to about 5 mm.

Since the shaped bodies added to the bath are composed of latex, the water soluble coagulating salt quickly penetrates into the aqueous phase of the shaped objects, thereby coagulating the latex with a minimum of internal coalescence. As a result, the coagulated elastomer within the nontacky coating remains sufficiently porous for a sufficient period of time to permit the washing out of water soluble components, including the coagulating salt. In the case of relatively crystalline elastomers, this porosity is retained indefinitely. In the case of relatively noncrystalline elastomers such as neoprene, the porosity decreases on long standing, but it does not completely disappear.

After the precipitated shaped objects have been coagulated and coated they can be separated from the bath by any suitable means. It is desirable to remove water soluble and volatile materials from the shaped objects after they have been separated from the bath. This may be accomplished by washing with water or a polar organic solvent, followed by squeezing, centrifuging or drying, using conventional techniques. The shaped objects should be washed until they contain less than about 3% by weight of water soluble material, and preferably less than about 1%.

After the water soluble material has been removed to the desired extent, the shaped objects are dried to remove volatile material. Drying may be carried out at air temperatures of about 25° C. to about 250° C. Preferably the drying is carried out at air temperatures of about 100° C. to about 135° C. During this drying operation the temperature of the shaped objects is kept below the known thermal decomposition temperature of the polymer. Drying is continued until the shaped objects contain less than about 1% by weight of volatile material, and preferably less than about 0.5%.

During these finishing steps, polymers that are relatively stiff, for example due to crystallinity, remain opaque and porous, while normally tacky polymers coalesce further to translucence. Nevertheless, even these retain vestiges of their former highly porous structure, and the nontacky nature of the hydrous oxide coating deposited on their exterior surface is retained. This nontacky coating may be supplemented by minor additions of talc, for example, in the latter stages of high temperature drying, if desired.

The nontacky coating on the normally tacky elastomer is initially also porous so that moisture, solvents, soluble reaction ingredients and by-products can be readily removed from within the coated object. The coating may represent from about 0.05 to about 3% by weight of the coated shaped object. Less than about 0.05% generally does not provide adequate nontacky properties, while more than about 3% usually gives no added advantage to offset increased cost. Preferably the coating is about 0.5 to about 2% by weight of the coated object. Washing operations, such as noted above, point up the necessity for both the nontacky coating and the coagulated elastomer being porous for a period of time after formation of the shaped objects.

Figure 3:
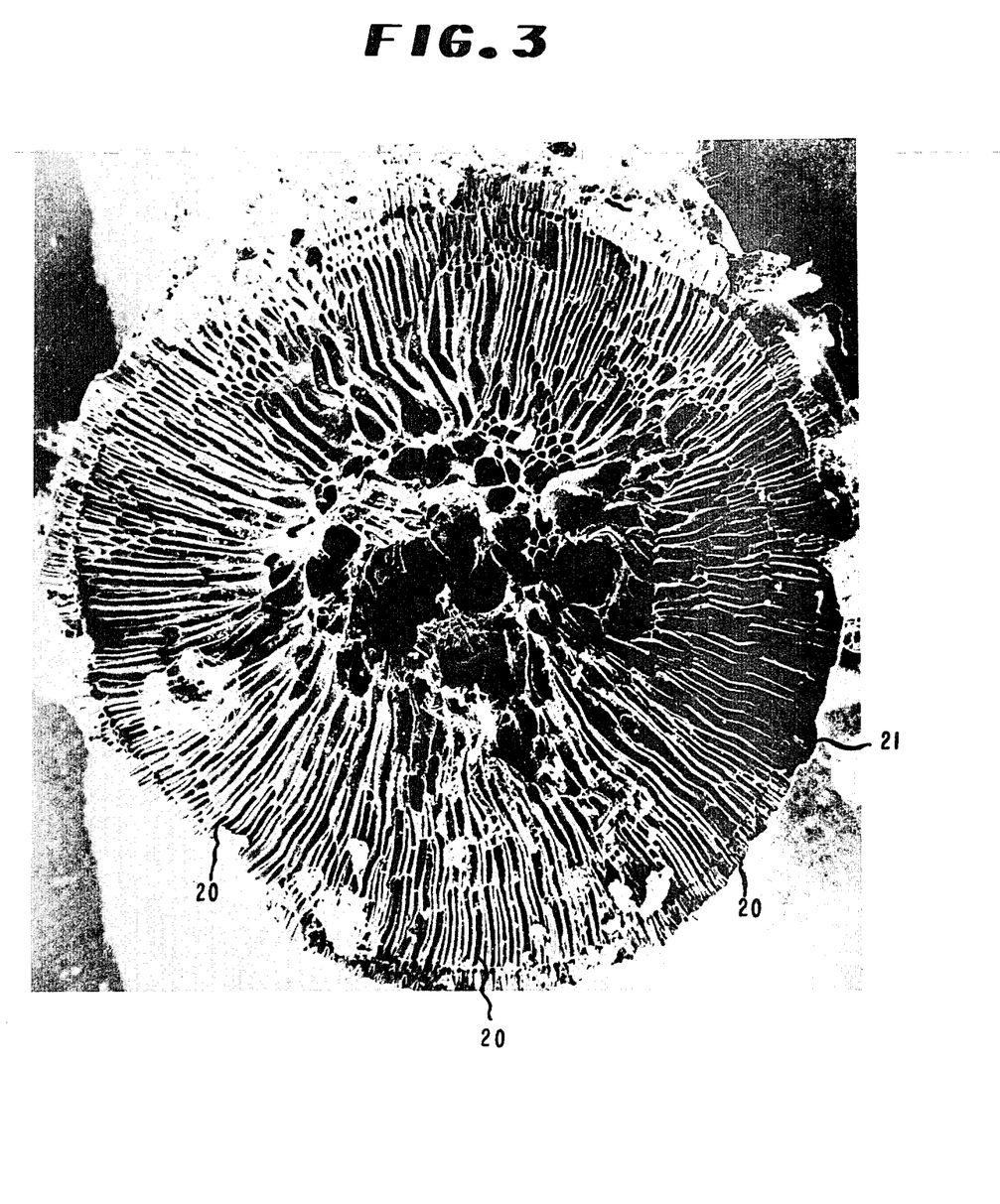
FIG. 3 is a photomicrograph of a cross section of a typical, porous shaped object in accordance with this invention. of a porous shaped object in accordance with this invention.

In the photomicrograph of FIG. 3, the porosity of the shaped object is apparent; voids appear as dark areas as observed at 20. The nontacky coating appears as light areas as is readily observed at 21.

The nontacky coated objects of this invention can also contain fillers, pigments, colorants, softeners, extenders, antioxidants, stabilizers, curing agents, and the like. Such materials may be incorporated by adding them to the starting polymer latex or to the coagulating and coating bath.

EXAMPLES OF THE INVENTION

The following examples illustrate the preparation of nontacky, elastomeric shaped objects of this invention.

Each of the washed and dried, nontacky, elastomeric-shaped objects prepared in these examples had a water soluble material content of less than about 3% by weight and a volatile material content of less than about 1%. In each case the inorganic oxide polymer coating was about 0.05 to about 3% by weight of the shaped objects and the minimum dimension of the shaped objects was about 0.01 to about 10 millimeters. All parts and percentages are by weight throughout the examples.

The neoprene latices used in these examples were prepared as follows.

Neoprene Latex #1

This latex was prepared from an aqueous, alkaline emulsion containing 100 parts of chloroprene and 0.23 part of dodecyl mercaptan as modifier and stabilized by 2.9 parts of the sodium salt of disproportionated wood rosin. Chloroprene was polymerized by adjusting the emulsion temperature to 40° C. and adding continuously, at a rate allowing control of the temperature at 40° C. by external cooling, an aqueous solution containing 0.3% $K_2S_2O_8$ and 0.015% Na salt of anthraquinone-$\beta$-sulfonic acid. The polymerization was terminated at about 67% conversion of the chloroprene monomer by the addition of an aqueous emulsion of a toluene solution containing 0.015 part of phenothiazine and 0.015 part of 4-tert.-butylcatechol.

After removal of residual monomer by distillation, the latex contained about 37% solids. The polymer had an inherent viscosity of 1.20 (0.1 g/100 ml benzene at 30° C.). The pH of the latex was about 12.

Neoprene Latex #2

An aqueous, alkaline emulsion was prepared containing 100 parts of chloroprene, 0.15 part of dodecyl mercaptan and 3.5 parts of the sodium salt of disproportionated wood rosin. Chloroprene was polymerized by adjusting the emulsion temperature to 10° C. and adding continuously an aqueous dispersion containing 1.0% $K_2S_2O_8$, 0.05% sodium salt of anthraquinone-$\beta$-sulfonic acid, and 0.14% cumene hydroperoxide at a rate allowing control of the temperature between 10° and 20° C. The polymerization was terminated at about 85% conversion of the chloroprene monomer by addition in the form of an aqueous emulsion of a toluene solution of 0.03 part of phenothiazine and 0.03 part of 4-tert.-butylcatechol.

After removal of residual monomer the emulsion contained 37% solids and had a pH of 12.5.

Neoprene Latex #3

The preparation of neoprene latex #1 was repeated except that the 100 parts of chloroprene was replaced by a mixture of 92 parts of chloroprene and 8 parts of 2,3-dichloro-1,3-butadiene. The polymerization was stopped at 65% conversion, and the latex, after stripping, contained about 33% solids and had a pH of 12.

Neoprene Latex #4

The procedure described for neoprene latex #2 was repeated except that the amount of dodecyl mercaptan in the monomer emulsion was 0.12 part instead of 0.15 part. The resulting latex had a solids content of 37% and a pH of 12.5.

EXAMPLE 1

A bath containing approximately 0.7% $SiO_2$ and 3.9% $Ca(NO_3)_2$ was made by combining 90 ml of 0.25 M aqueous silicic acid (produced by the ion exchange of $H^+$ for $Na^+$ in 0.25 M sodium metasilicate solution), 10 ml of a 50% aqueous $Ca(NO_3)_2$ solution, and 100 ml of absolute ethanol. About 20 ml of neoprene latex #1 (37% solids, pH 12) was added dropwise to this bath from an orifice about 2 cm above it. The surface of the drops coagulated on contact to yield globules which within a few minutes were coagulated throughout and covered with a nontacky coating. The resulting opaque pellets were lifted from the bath and dried in a 60° C. oven. At room temperature they remained dry to the touch and free-flowing.

For comparison, the following experiment, not within the scope of the invention, was carried out. The above example was repeated using 90 ml of water in place of the silicic acid solution. The drops of emulsion coagulated rapidly, but remained very tacky and were difficult to separate after drying at 60° C.

EXAMPLE 2

A bath containing approximately 3.6% $SiO_2$ and 2.6% $CaCl_2$ was made by mixing 1000 ml of 1 M silicic acid, 60 ml of 50% $CaCl_2$ solution, 700 ml of absolute ethanol, and 240 ml of distilled water. About 200 ml of neoprene latex #1 (37% solids, pH 12) was introduced into the bath dropwise. The resulting pellets were allowed to remain in the bath for 30 minutes. They were removed, washed with 70% ethanol, and dried for 48 hours in a vacuum drying pistol heated by refluxing acetone. The resulting pellets had the following analysis: Ca, 0.25; Na, 0.38; Si, 0.51; % ash, 2.8. Pellets prepared in this way retained a small amount of alkali. Such amounts of residual alkali stabilize neoprene against HCl degradation. A 5% suspension of these pellets in water had a pH of 9.0. The pellets were more than 90% soluble in toluene, indicating little or no crosslinking of the neoprene had occurred.

EXAMPLE 3

An alcohol-free bath containing approximately 1.5% $SiO_2$ and 2.1% $CaCl_2$ was made, utilizing a dilute aqueous nonionic surfactant solution to reduce interfacial tension at the air-liquid interface. A mixture of 10 ml of freshly prepared 0.5 M silicic acid, 9.4 ml of 0.2% aqueous trimethylnonanol ether of ethylene oxide (Tergitol ® TMN-6, Union Carbide), and 0.6 ml of 50% $CaCl_2$ completed the bath. About 2 ml of neoprene latex #1 (37% solids, pH 12) introduced dropwise into the bath formed opaque nonsticking pellets. These were isolated, washed with water, and air dried to produce free-flowing, nonsticking pellets 3-4 mm in diameter. The moisture content of the pellets was 0.38%; the ash residue was 3.05%; other analyses were: Ca, 0.44%; Na, 0.26%; Si, 1.11%.

EXAMPLE 4

A bath containing approximately 1.5% $SiO_2$ and 2.1% $CaCl_2$ was prepared from 1000 ml of 0.5 M silicic acid (pH 3.3), 940 ml of 0.2% aqueous trimethylnonanol ether of ethylene oxide (Tergitol ® TMN-6), and 60 ml of 50% aqueous $CaCl_2$ solution. The initial pH of the bath was 4.45. One hundred milliliters of neoprene latex #1 (37% solids, pH 12) was added dropwise over a period of 10 minutes during which the bath was stirred and the pH was maintained at 4.0 by continuous addition of 1.0 N hydrochloric acid. The bath showed no evidence of gelation. The neoprene pellets which formed were filtered from the bath on a 100 mesh stainless steel screen, washed with cold water and dried. They were nontacky and free-flowing.

EXAMPLE 5

A silicic acid solution was prepared from a sodium silicate solution having an $SiO_2/Na_2O$ ratio of 1.95. The sodium silicate solution utilized was Grade 6 (Du Pont Co.) which had a viscosity of 60,000 centipoises (68° C.), a specific gravity of 1.708, % $Na_2O=18.4$, and % $SiO_2=36.0$. This solution (166.5 ml) was diluted to 2 liters with distilled water. The resulting solution was passed through a cation exchange column in acid form containing 1300 gms of cation exchange resin (Rexyn 101, $H^+$). The first 500 ml of effluent, equivalent to the retention volume of the column, was discarded and the remainder collected.

A 1000 ml portion of this 0.85 M silicic acid solution was employed in the procedure of Example 4 to give a bath containing approximately 2.5% $SiO_2$. At the start of the addition of neoprene latex the bath was at pH 3.1 and at the conclusion the pH was 4.1. The resulting pellets were washed with distilled water and dried. They showed little tendency to aggregate.

EXAMPLE 6

A bath containing approximately 1.4% $SiO_2$ and 7.6% NaCl was prepared from 15 ml of 10% aqueous NaCl and 5 ml of 1.0 M aqueous silicic acid. About 2 ml of a 55% solids latex of a copolymer derived about 18% from vinyl acetate and about 82% from ethylene was added dropwise to the bath. The drops coagulated into pellets which were filtered from the bath, dried under vacuum at 80° C., washed with water to remove all traces of NaCl and again dried. They were nontacky and free-flowing. For comparison, the following experiments, not within the scope of the invention, were carried out. The above example was repeated twice, first with replacement of the NaCl solution by water, and second by replacement of the silicic acid solution by water. In both instances, the treated drops were too fragile to be removed whole from the bath.

EXAMPLE 7

A solution containing approximately 1.4% $SiO_2$ and 6.1% NaCl was prepared by adding 262 ml of 1 N HCl, 14.7 gm of NaCl, and 38 ml of $H_2O$ to 100 ml of rapidly stirred 1 M $Na_2SiO_3.9H_2O$. To this solution at about 0° C. were added 20 drops of the vinyl acetate/ethylene copolymer latex described in Example 6. After 10 minutes, the resulting pellets were removed from the bath and dried in a vacuum oven at 80° C. for 2 hours. The pellets were coated with a nontacky coating and were free-flowing.

EXAMPLE 8

About 200 ml of a 62% solids natural rubber latex (Latex TSC, General Latex Co.) was added dropwise to a bath containing approximately 0.9% $SiO_2$ and 2.5% $CaCl_2$ which was prepared from 250 ml of 1 M silicic acid, 1750 ml of absolute EtOH, and 60 ml of 50% aqueous $CaCl_2$. The latex rapidly coagulated and a nontacky coating formed on the surface of the particles. When isolated and dried, the pellets were nontacky and free-flowing.

EXAMPLE 9

Into neoprene latex#1 (37% solids, pH 12) was mixed enough carbon black (Sterling R, Cabot) to yield a uniform emulsion containing 4% of carbon black based on the neoprene. About 20 ml of this modified latex was added dropwise to a bath containing 1.5% $SiO_2$ and 2.1% $CaCl_2$ prepared from 100 ml of 0.5 M aqueous silicic acid, 94 ml of 0.2% aqueous trimethylnonanol ether of ethylene oxide (Tergitol ® TMN-6), and 6 ml of 50% aqueous $CaCl_2$. The drops were delivered from a Pasteur pipette near the surface of the bath and the bath was stirred by a magnetic bar. After 30 minutes in the bath the pellets which formed were removed by decantation, washed three times with 500 ml portions of water and air dried. The carbon-containing pellets were nontacky and free-flowing.

EXAMPLE 10

The procedure of Example 9 was repeated with the exception that the 4% of carbon black in the latex was replaced by 10% of atomized aluminum powder. Nontacky, free-flowing aluminum-containing pellets were obtained.

EXAMPLE 11

The procedure of Example 9 was repeated with the exception that the 4% of carbon black in the latex was replaced by 10% of alumina trihydrate (powder, baked at 135°-195° C.). Nontacky, free-flowing alumina-containing pellets were obtained.

EXAMPLE 12

The procedure of Example 9 was repeated with the exception that the 4% of carbon black in the latex was replaced by 10% of magnetic iron oxide ($Fe_3O_4$, MO-4232, Pfizer Minerals). Nontacky, free-flowing iron oxide-containing pellets were obtained which were readily manipulated with magnets.

EXAMPLE 13

About 100 ml of a 65% solids latex of fluoroelastomer terpolymer derived from 45% vinylidene fluoride, 30% hexafluoropropylene and 25% tetrafluoroethylene was added dropwise to a bath prepared from 500 ml of 0.5 M aqueous silicic acid saturated with $BaCl_2$, 500 ml of water saturated with $BaCl_2$, and 2 ml of 2% aqueous trimethylnonanol ether of ethylene oxide (Tergitol ® TMN-6). The drops flattened on contact with the bath, but coagulated throughout and were coated with a nontacky coating. The particles were decanted from the bath, washed repeatedly with water and air dried to give white, free-flowing flakes about 5 mm in diameter.

EXAMPLE 14

A mixture was prepared from equal volumes of neoprene latex #1 (37% solids, pH 12) and the aqueous fluoroelastomer latex described in Example 13. This mixture (20 ml) was introduced dropwise into a bath containing approximately 1.5% $SiO_2$ and 2.1% $CaCl_2$ prepared from 100 ml of 0.5 M aqueous silicic acid, 94 ml of 0.2% aqueous trimethylnonanol ether of ethylene oxide (Tergitol ® TMN-6), and 6 ml of 50% aqueous $CaCl_2$. The pellets which formed were washed with water and then dried, first in air and then over $P_2O_5$ under vacuum at room temperature. The resulting mixed elastomer pellets were nontacky and free-flowing.

EXAMPLE 15

A portion (422 ml) of sodium silicate solution (Grade F, Du Pont Co., $SiO_2/Na_2O$ ratio=3.25, $Na_2O$=8.7%, $SiO_2$=28.4%, viscosity (68° C.)=160 cp, specific gravity=1.386) was diluted to 4 liters with distilled water. This solution was put through the cation exchange column in acid form described in Example 5. A bath containing approximately 0.5% $SiO_2$ and 7.6% $NH_4Cl$ was prepared using 250 ml of the resulting approximately 0.69 M silicic acid solution, 1000 ml of 15% $NH_4Cl$, 250 ml of distilled water, and 500 ml of 0.05% aqueous trimethylnonanol ether of ethylene oxide (Tergitol ® TMN-6). Two hundred ml of neoprene latex #2 (37% solids, pH 12.5) was added dropwise to the bath. The pellets which formed were allowed to remain in the bath for 30 minutes. The bath was decanted and the pellets were washed three times with 2-liter portions of water. The pellets were air dried at room temperature and atmospheric pressure. The resulting pellets were nontacky and free-flowing.

EXAMPLE 16

A bath was prepared with a buffer to resist the pH elevation associated with the addition of alkaline neoprene latex. The buffer was prepared by diluting a mixture of 1.75 ml of 2 M HCl, 0.1 g of trimethylnonanol ether of ethylene oxide (Tergitol ® TMN-6), and 12.60 ml of 2 M gylcine solution to 50 ml with distilled water. The buffer was then added to 100 ml of 0.69 M silicic acid (prepared according to Example 15), and 50 ml of 30% aqueous $NH_4Cl$. Twenty ml of neoprene latex #2 (37% solids, pH 12.5) was added to the bath dropwise. The pH of the bath changed from 3.35 to 3.55 as compared to a pH change to approximately 6.0 for a similar unbuffered bath. Approximately 80 ml of the latex could be added to the buffered bath before the pH rose above 6.0, at which pH gelation of the bath occurred rapidly.

EXAMPLE 17

A bath containing approximately 2.0% $SiO_2$ and 7.9% $NH_4Cl$ was prepared from 1000 ml of 0.69 M silicic acid, (prepared according to Example 15) 500 ml of 30% $NH_4Cl$, and 500 ml of 0.2% aqueous trimethylnonanol ether of ethylene oxide (Tergitol ® TMN-6). A 200-ml sample of neoprene latex #3 (33% solids, pH 12) was adjusted from pH 12.0 to pH 12.5 by addition of 1 N NaOH. This latex was added dropwise to the bath. The pellets which formed were washed with water and then freeze-dried at about −178° C. under high vacuum. At room temperature the dried pellets were nontacky and free-flowing.

EXAMPLE 18

A bath was prepared using an alumina-modified silica sol (Ludox ® 130 M, Du Pont Co.). This product is a 30% solids, acidic, aqueous dispersion of positively-charged colloidal particles consisting of a dense silica core coated with positively-charged polymeric alumina. The approximate chemical composition is $SiO_2$=26%, $Al_2O_3$=4.0%, Cl=1.4%, MgO=0.2%, viscosity (25° C.)=5–15 cp, pH (25° C.)=4.3–4.5, approximate particle diameter=16 m$\mu$, and specific gravity (25° C.)=1.23.

The bath containing approximately 0.7% $SiO_2/Al_2O_3$ and 6.1% $NH_4Cl$ was composed of 116 ml of 0.2% aqueous sodium heptadecyl sulfate anionic surfactant (Tergitol ® Anionic 7, Union Carbide), 80 ml of 15% aqueous $NH_4Cl$, and 4 ml of the alumina-modified silica sol described above. To this bath was added dropwise 20 ml of neoprene latex #2 (37% solids, pH 12.5). The drops coagulated and the resulting coated pellets were washed and dried. Nontacky, free-flowing pellets were obtained.

EXAMPLE 19

A bath containing approximately 1.0% $SiO_2$ and 8.0% $AlCl_3$ was prepared from 5 ml of 0.69 M aqueous silicic acid (prepared according to Example 15), 9 ml of 30% aqueous $AlCl_3.6H_2O$, 5 ml of 0.2% aqueous trimethylnonanol ether of ethylene oxide (Tergitol ® TMN-6), and 1 ml of distilled water. To this bath was added dropwise 2 ml of neoprene latex #2 (37% solids, pH 12.5). The drops coagulated and were removed from the bath, washed and dried. Nontacky, free-flowing pellets were obtained.

EXAMPLES 20–23

Four baths were prepared, each from 2.5 ml of 0.69 M aqueous silicic acid (prepared according to Example 15), 5 ml of 0.5% aqueous trimethylnonanol ether of ethylene oxide (Tergitol ® TMN-6), and 12.5 ml of a 30% aqueous solution of the indicated salts:
Example 20—$NH_4Br$
Example 21—$(NH_4)_2HC_6H_5O_7$(citrate)
Example 22—$(NH_4)_2Cr_2O_7$
Example 23—$NH_4SCN$
To each bath was then added dropwise 2 ml of neoprene latex #2 (37% solids, pH 12.5). The elastomer pellets which formed were separately washed with water and dried. All yielded nontacky, free-flowing pellets.

EXAMPLE 24

Ten ml of naphthenic extender oil (Sundex ® 790, Sun Oil Co.) was added to 90 ml of neoprene latex #2 (37% solids, pH 12.5) and the mixture vigorously shaken to give an emulsion. A bath containing approximately 1.0% $SiO_2$ and 7.6% $NH_4Cl$ was prepared from 50 ml of 0.69 M aqueous silicic acid (prepared according to Example 15), 100 ml of 15% aqueous $NH_4Cl$, and 50 ml of 0.05% aqueous trimethylnonanol ether of ethylene oxide (Tergitol ® TMN-6). The oil extended polymer latex was added dropwise to the bath. The pellets which formed were separated from the bath, washed with water and dried to yield nontacky, free-flowing pellets of oil-extended elastomer.

EXAMPLE 25

A bath containing approximately 0.9% $SiO_2$ and 10.0% NaCl was prepared by dissolving 100 g of NaCl in 900 g of 0.35 M aqueous silicic acid, dissolving 100 g of NaCl in 900 g of 0.05% aqueous trimethylnonanol ether of ethylene oxide (Tergitol ® TMN-6), and combining the two solutions. The bath was maintained at pH 4–4.5 by additions of 1 N HCl during the dropwise addition of 200 ml of neoprene latex #2 (37% solids, pH 12.5). The pellets which formed were allowed to stand in the bath for 16 hours, then washed with water and dried to yield nontacky, free-flowing pellets of uncured elastomer.

EXAMPLE 26

A bath containing approximately 1.3% $SiO_2$, 3.9% $NH_4Cl$ and 11.1% NaCl was made by combining 25 ml of 0.69 M silicic acid (prepared in accordance with Example 15), 10 ml of 30% $NH_4Cl$ in 0.2% aqueous trimethylnonanol ether of ethylene oxide (Tergitol ® TMN-6), 40 ml of 20% NaCl in 0.2% aqueous trimethynonanol ether of ethylene oxide (Tergitol ® TMN-6), and 125 ml of distilled water. The bath was adjusted to pH 5.0 with 1 N NaOH. Twenty milliliters of neoprene latex #2 (37% solids, pH 12.5) was added to the bath dropwise while the pH was maintained at 5.0 by dropwise addition of 1 N HCl. The resulting pellets were removed from the bath after one hour, washed three times with 500-ml portions of distilled water, and air dried to yield nontacky, free-flowing pellets.

EXAMPLE 27

A bath containing approximately 0.5% chlorhydrol (aluminum chlorohydroxide polymeric complex containing 47.0% $Al_2O_3$ and 16.3% chloride, Reheis Chemical Co.) and 2.3% $CaCl_2$ was prepared by combining 10 ml of 10% aqueous chlorhydrol, 175 ml of 0.05% aqueous trimethylnonanol ether of ethylene oxide (Tergitol ® TMN-6), and 15 ml of 25% aqueous $CaCl_2$. The solution was brought to pH 5.0 with 1 N NaOH. As 20 ml of neoprene latex #2 (37% solids, pH 12.5) was added dropwise, the bath was gently stirred and maintained at pH 5.0 by dropwise addition of 1 N HCl. The pellets were allowed to remain in the bath for 1 hour, after which they were washed with three 250-ml charges of distilled water. The pellets were then air dried to form free-flowing nontacky elastomer particles.

EXAMPLE 28

A surfactant-free bath containing 1.0% $SiO_2$ and 7.6% $NH_4Cl$ was prepared from 100 ml of 0.69 M aqueous silicic acid (prepared according to Example 15), 200 ml of 15% aqueous $NH_4Cl$, and 100 ml of distilled water. A 100 ml graduated cylinder was filled with this bath. From a 10 ml syringe fitted with a 20 gauge needle, neoprene latex #2 (37% solids, pH 12.5) was extruded as a continuous stream onto the surface of the bath at one side of the graduated cylinder, forming a small puddle. By grasping the edge of the puddle with tweezers at the other side of the graduated cylinder a continuous fiber of coagulated, hydrous silica-coated polychloroprene was drawn off. After being washed and air dried, the fiber was nontacky.

EXAMPLE 29

The procedure of Example 28 was repeated except that more force was used on the syringe, thus causing the stream of latex to go through the surface of the bath. The weight of the coagulating stream pulled it to the bottom of the bath where a nontacky continuous fiber of the elastomer about 1-2 mm in diameter collected.

EXAMPLE 30

The procedure of Example 29 was repeated except that, after the interface at the surface of the bath had been penetrated by the latex stream, the force on the syringe was reduced and adjusted so that free drops fell from the needle into the bath. The pellets which formed were nontacky and free-flowing when washed and dried.

EXAMPLE 31

Part A

To 200 ml of a 30% solids aqueous colloidal sol of alumina-modified silica of pH 8.6-9.3 (Ludox® AM, Du Pont Co.) under agitation in a blender was added 2.0 ml of concentrated HCl (38%). The resulting colloidal solution containing approximately 29% solids had a pH of 3.0.

Part B

A modified neoprene latex was prepared by adding 10 ml of a 1% aqueous solution of hydroxyethyl cellulose (Cellosize® QP 30,000, Union Carbide Corp.) to 90 ml of neoprene latex #2 (37% solids, pH 12.5). The emulsion was kept agitated to avoid creaming.

Part C

A bath containing approximately 4.3% $SiO_2/Al_2O_3$ and 7.5% $NH_4Cl$ was prepared by mixing 2.5 ml of the colloidal silica solution prepared in Part A above, 10.0 ml of 15% aqueous $NH_4Cl$, 1 ml of a 0.2% aqueous solution of an amphoteric fluorinated surfactant (Zonyl® FSB, Du Pont Co.), and 6.5 ml of water. To this bath was added dropwise about 5 ml of the modified neoprene latex prepared in Part B above. The pellets which formed were separated from the bath, washed with water, and dried to obtain nontacky, free-flowing, substantially spherical pellets of modified neoprene.

EXAMPLE 32

A bath containing approximately 0.5% $SiO_2$, 7.6% $NH_4Cl$ and 0.01% $AlCl_3$ was prepared by mixing 250 ml of 0.69 M aqueous silicic acid (prepared according to Example 15 and aged for two days), 1000 ml of 15% aqueous $NH_4Cl$, 200 ml of water, 500 ml of 0.05% aqueous trimethylnonanol ether of ethylene oxide (Tergitol® TMN-6), and 50 ml of 1% aqueous $AlCl_3 \cdot 6H_2O$ which had been adjusted to pH 5.0 by addition of 1 N NaOH. This bath was kept at pH 4.5-5.0 by addition of 1 N HCl during the dropwise addition of 200 ml of neoprene latex #2 (37% solids, pH 12.5) which took eight minutes, and for one hour thereafter. The drops, which coagulated, were separated from the bath, washed three times with water, soaked for three hours in water, and then air dried. The resulting pellets were nontacky and free-flowing.

EXAMPLE 33

A silica sol containing approximately 4.6% solids with a pH of 5.0 was prepared by adding 265 ml of a 15% solids aqueous silica sol (Nyacol® 215, Nyacol, Inc., pH 10.5) dropwise with vigorous stirring to a solution of 70 ml of 1 N in 595 ml of water. A bath containing approximately 0.6% $SiO_2$, 7.6% $NH_4Cl$ and 0.013% $AlCl_3$ was prepared by mixing 250 ml of the above sol, 1000 ml of 15% aqueous $NH_4Cl$, 700 ml of a 0.03% aqueous solution of an amphoteric fluorinated surfactant (Zonyl® FSB, Du Pont Co.), and 50 ml of 1% aqueous $AlCl_3 \cdot 6H_2O$ which had been adjusted to pH 5.0 with 1 N NaOH. The resulting bath had a pH of 4.3. This bath was stirred and kept at pH 4.5-5.0 by addition of HCl during the dropwise addition of 200 ml of neoprene latex #2 (37% solids, pH 12.5). The pellets which formed were stirred in the bath for one hour, separated, washed three times with water and soaked in 2 liters of water. After drying the pellets were nontacky and showed little tendency to agglomerate.

EXAMPLE 34

In the manner of Example 33, 42 ml of a 49% solids aqueous colloidal silica sol (Ludox® TM, Du Pont Co., pH 8.9, particles 220-250 Å in diameter) was blended with 3.9 ml of 1 N HCl and 454 ml of water to give an aqueous sol containing 5.6% $SiO_2$. A bath containing approximately 0.7% $SiO_2$, 7.6% $NH_4Cl$ and 0.013% $AlCl_3$ was prepared by substituting 250 ml of the above sol for the sol employed in Example 33 and maintained at a pH of 5.0 by addition of 1 N HCl. The remaining procedure of Example 33 was then repeated to yield nontacky, free-flowing elastomer pellets.

EXAMPLE 35

In the manner of Example 33, 125 ml of a 30% solids aqueous colloidal silica sol (Ludox® SM, pH 9.9, Du Pont Co.) in 125 ml of distilled water, was blended with 28 ml of 1 N HCl and 637 ml of water. A bath was prepared by substituting 250 ml of the above sol for the sol employed in Example 33 and the remaining procedure of Example 33 was repeated. Nontacky, free-flowing pellets were obtained.

EXAMPLE 36

To 400 ml of a 30% solids aqueous colloidal sol of alumina-modified silica of pH about 8.9 (Ludox® AM, Du Pont Co.) was added 4.0 ml of concentrated (38%) hydrochloric acid with vigorous agitation. The resulting sol had a pH of 3.0 and a solids content of about 29.7%. A bath containing approximately 4.3% $SiO_2$ and 7.5% $NH_4Cl$ was prepared from 250 ml of this sol, 1000 ml of 15% aqueous $NH_4Cl$, 650 ml of water, and 100 ml of a 0.2% aqueous amphoteric fluorosurfactant solution (Zonyl ® FSB, Du Pont Co.). The bath had a pH of 3.7 and was kept below pH 4.5 by adding 0.1 N HCl during the dropwise addition of 200 ml of neoprene latex #2 (37% solids, pH 12.5). The drops coagulated and were stirred in the bath for 30 minutes, separated, washed three times with water and dried at 60° C. to obtain nontacky pellets.

EXAMPLE 37

A bath containing approximately 1.5% $SiO_2$ and 7.6% $CaCl_2.2H_2O$ was prepared by mixing 100 ml of 0.69 M aqueous silicic acid (prepared according to Example 15), 94 ml of 0.2% trimethylnonanol ether of ethylene oxide (Tergitol ® TMN-6) in ethanol, and 6 ml of a 50% aqueous solution of $CaCl_2.2H_2O$. To this bath was added dropwise about 20 ml of a 40% solids butadiene/acrylonitrile copolymer latex (Chemigum ® Nitrile Latex 550, Goodyear) having a pH of 8.0. The coagulated drops were stirred in the bath for one hour, separated, and dried under vacuum at 60° C. to obtain perfectly spherical pellets which were nontacky and free-flowing.

EXAMPLE 38

A mixed latex was prepared from 100 ml of neoprene latex #2 (37% solids, pH 12.5) and 60 ml of natural rubber latex TSC (62% solids, General Latex Co.). The resulting mixture was brought to pH 12.2 by adding 1 N NaOH. A bath was prepared like the one in Example 37, except on a 10-fold larger scale. During dropwise addition of the mixed latex to the bath, the bath was maintained at pH 5.0 by the addition of 1 N HCl. The coagulated drops remained in the bath for one hour. They were then separated, washed three times with water, and dried, first for five hours in air and then for three days under vacuum over $P_2O_5$ at room temperature. The coated pellets of neoprene/rubber were nontacky and free-flowing.

EXAMPLE 39

A bath containing approximately 0.7% $SiO_2/Al_2O_3$ and 7.6% $NH_4Cl$ was prepared by mixing 40 ml of a positive alumina-modified silica sol (Ludox ® 130 M, Example 18), 1000 ml of 15% aqueous $NH_4Cl$, and 960 ml of 0.05% aqueous sodium lauryl sulfate (Duponol ® WAQE, Du Pont Co.). The bath had a pH of 4.9 and was maintained at pH 5.0 by addition of 1 N HCl during dropwise addition of 200 ml of neoprene latex #2 (37% solids, pH 12.5). The coagulated drops were stirred in the bath for one hour, washed with water, and air dried to yield nontacky, free-flowing pellets.

EXAMPLE 40

A bath containing approximately 0.1% chlorhydrol and 7.6% $NH_4Cl$ was prepared by mixing 1000 ml of 15% aqueous $NH_4Cl$, 980 ml of 0.1% aqueous sodium lauryl sulfate (Duponol ® WAQE), and 20 ml of 10% aqueous chlorhydrol ($Al_2O_3$ 47.0%, chloride 16.3%, Reheis Chemical Co.). To the bath was added dropwise 200 ml of neoprene latex #4 while maintaining the bath at pH 5.5 by adding 1 N HCl. After the addition, the pellets were stirred in the bath for one hour, washed with water, and air dried. The uncured elastomer pellets were nontacky and free-flowing.

EXAMPLE 41

Using the apparatus illustrated in FIGS. 1 and 2, the following aqueous solutions were mixed in tank 1.

10,000 ml of 15% aqueous ammonium chloride
9,500 ml of 0.03% aqueous sodium lauryl sulfate surfactant (Duponol ® WAQE)
500 ml of 30% solids colloidal alumina-modified silica sol (Ludox ® 130M, Example 18)

The bath thus prepared had a pH of 5.4 and contained approximately 0.9% $SiO_2$ and 7.6% $NH_4Cl$. While providing agitation, 3480 g of a 40% solids neoprene latex prepared in the manner of neoprene latex #2 was added through the capillary tubes over a period of 13 minutes. Simultaneously, the pH of the bath was maintained at 5.4 by gradual addition of 51 ml of 1 N hydrochloric acid. Immediately following the 13-minute latex addition period, agitation was continued for 17 minutes with no further addition of acid, during which time the pH of the bath rose to 6.6. The particles were kept in suspension by agitation during the 17-minute holding period. The agitator was then turned off, the particles were allowed to settle, and the supernatant liquid was separated from the particles by decantation.

The particles were washed by addition of 8000 ml of distilled water followed by a 5-minute agitation period. The agitator was then turned off and the supernatant liquid was separated from the particles by decantation. This washing procedure was repeated twice. The particles were allowed to dry in the air to a constant weight of 1315 g. They were free-flowing and nontacky.

EXAMPLE 42

Using the apparatus illustrated in FIGS. 1 and 2, a bath was prepared by mixing the following aqueous solutions in tank 1.

10,000 ml of 15% aqueous ammonium chloride
9,950 ml of 0.03% aqueous sodium lauryl sulfate surfactant (Duponol ® WAQE)
50 ml of a polyaluminic acid-modified aqueous colloidal silica sol The modified silica sol was prepared by slowly adding 500 g of 35% aqueous boric acid-stabilized basic aluminum acetate solution (Niaproof ®, Union Carbide Corp.) to 400 g of aqueous colloidal silica sol [Ludox ® SM, Du Pont Co., 30% $SiO_2$, average particle size 7 m$\mu$, weight ratio $SiO_2/Na_2O$ 50, pH (25° C.) 9.9, freezing point 0° C.] in a blender and filtering the mixture through coarse filter paper to remove the small amount of gel. The bath thus prepared had a pH of 5.3 and contained approximately 0.1% colloidal silica sol coated with polyaluminic acid and 7.6% $NH_4Cl$.

While providing agitation, 3590 g of 40% solids neoprene latex prepared like neoprene latex #1 was added to the bath through the capillary tubes over a period of 9 minutes, during which time the pH of the bath rose to 6.7. Agitation was continued, keeping the particles in suspension for an additional 51 minutes, with no appreciable change in pH of the bath. The agitator was turned off, the particles were allowed to settle and the supernatant liquid was separated from the particles by decantation.

The particles were washed by addition of 8000 ml of distilled water followed by a 10-minute agitation period. The agitator was then turned off and the supernatant liquid was separated from the particles by decantation. This washing procedure was repeated three times. The particles were allowed to dry in the air to a constant weight of 1446 g. They were free-flowing and nontacky.

EXAMPLE 43

Using the apparatus illustrated in FIGS. 1 and 2, the following aqueous solutions were mixed in tank 1.
  10,000 ml of 15% aqueous ammonium chloride
  9,950 ml of 0.03% aqueous sodium lauryl sulfate surfactant (Duponol® WAQE)
  50 ml of the polyaluminic acid-modified aqueous colloidal silica sol described in Example 42

The bath thus prepared had a pH of 5.2. While providing agitation, 4578 g of 40% solids neoprene latex prepared like neoprene latex #2 was added through the capillary tubes over a period of 18 minutes, during which time the pH rose to 6.7. Agitation was continued, keeping the particles in suspension for an additional 42 minutes, with no appreciable change in pH of the bath. The agitator was turned off, the particles were allowed to settle and the supernatant liquid was separated from the particles by decantation.

The particles were washed by addition of 20,000 ml of distilled water followed by a 10-minute agitation period. The agitator was then turned off and the supernatant liquid was separated from the particles by decantation. This washing procedure was repeated once. The particles were allowed to dry in air to a constant weight of 1767 g. They were free-flowing and nontacky.

EXAMPLE 44

A bath containing approximately 0.6% $SiO_2$, 0.9% $CaCl_2$, 0.3% $AlCl_3$ and 0.6% NaCl was prepared by mixing 1694 g of $H_2O$, 10.0 g of $AlCl_3 \cdot 6H_2O$, 24.2 g of $CaCl_2 \cdot 2H_2O$, 12.0 g of NaCl, 1.2 g of an amphoteric fluorinated surfactant (Zonyl® FSB, Du Pont Co.), and 250 ml of a colloidal silica sol having a pH of 2.0 and containing 4.8% $SiO_2$. This colloidal sol was prepared by adding a mixture of 125 ml of a 30% solids aqueous silica sol (Ludox® SM, Du Pont Co.) and 125 ml of $H_2O$ to a running blender containing 637 ml of $H_2O$ and 40 ml of 1 N HCl.

To this bath was added dropwise 198 ml of 40% solids neoprene latex prepared like neoprene latex #1. After 30 minutes, the bath was decanted from the pellets which had formed. The pellets were soaked in 2 liters of $H_2O$ for 30 minutes and then filtered from the wash water and spun for 2 minutes in a basket centrifuge. The pellets were then shaken with 1.5% of their weight of talcum powder and spread in a tray to air dry overnight. They were further dried over $P_2O_5$ under vacuum at room temperature. The resulting nontacky free-flowing pellets contained 1.56 milliequivalents of residual alkalinity per 100 g of isolated polymer, as shown by nonaqueous titration to a bromophenol end point.

EXAMPLE 45

A bath containing approximately 0.5% $SiO_2$, 0.9% $CaCl_2$ and 0.3% $AlCl_3$ was prepared by mixing 1714.6 ml of $H_2O$, 10.0 g of $AlCl_3 \cdot 6H_2O$, 24.4 g of $CaCl_2 \cdot 2H_2O$, 1.2 g of the trimethylnonanol ether of ethylene oxide (Tergitol® TMN-6) and 250 ml of 0.69 M silicic acid which had aged for five days. To this bath was added dropwise 200 ml of 40% solids neoprene latex prepared like neoprene latex #1. The pellets which formed were isolated, washed and dried as in the procedure of Example 44. The resulting free-flowing, nontacky pellets had a residual alkalinity of 2.43 meq/100 g.

EXAMPLE 46

A latex mixture was prepared from 2 ml of the sodium silicate solution described in Example 15, 15 ml of 1 N NaOH, and 198 ml of 40% solids neoprene latex prepared like neoprene latex #2. This mixture was added dropwise to a bath containing approximately 1.8% $CaCl_2$, 1.7% NaCl, 0.6% $AlCl_3$ and 0.6% modified sol prepared from 898.6 ml of $H_2O$, 1000 ml of 2% $AlCl_3 \cdot 6H_2O$ (adjusted to pH 3.5 with 1 N NaOH), 36.4 g of anhydrous $CaCl_2$, 34 g of NaCl, 1.0 g of 30% sodium lauryl sulfate (Duponol® WAQE), and 30 ml of the modified aqueous colloidal silica sol described in Example 42. The pellets which formed were removed from the bath after 15 minutes, washed with water, centrifuged, treated with talc and dried as described in Example 44. The resulting pellets were nontacky and free-flowing.

I claim:

1. A method of preparing nontacky, elastomeric shaped objects which comprises bringing shaped bodies of a normally tacky, uncured elastomer latex having a solids content of 20% to 65% by weight into contact with an aqueous bath containing, based on the total weight of the bath,
   (a) 0.5 to 25% by weight of a soluble coagulating salt for the latex, and
   (b) 0.01 to 5% by weight of a soluble or colloidally dispersed, hydrous, inorganic oxide selected from the group consisting of silicic acid polymers aluminic acid polymers, silicic acid-aluminic acid copolymers, and mixtures thereof, said bath having a pH of 2 to 7 such that, when a drop of 1.0 N NaOH is added to the bath, the drop is immediately surrounded by a cloudy coating of gelled, hydrous, inorganic oxide, thereby coagulating the latex and forming highly porous shaped objects of the coagulated elastomer coated with water insoluble, hydrous, inorganic oxide.

2. The method of claim 1 in which the elastomer is neoprene.

3. The method of claim 2 in which the inorganic oxide is soluble.

4. The method of claim 3 in which the inorganic oxide is polysilicic acid which has not aged for more than 90% of its gel time prior to being added to the bath.

5. The method of claim 2, in which the latex has a solids content of 35 to 50%, the latex is added as drops above the surface of the bath, and the pH of the bath is 2.5 to 5.5.

6. The method of claim 5 in which the bath contains 1 to 10% by weight of coagulating salt including 0.002 to 2% by weight of an ionizable salt of a metal selected from the group consisting of aluminum and yttrium, and 0.03 to 2% by weight of inorganic oxide.

7. The method of claim 6 in which the inorganic oxide is soluble.

8. The method of claim 7 in which the inorganic oxide is polysilicic acid which has aged for 5 to 70% of its gel time prior to being added to the bath.

9. The method of claim 1 in which the highly porous shaped objects are washed with water until the water soluble material content is less than 3% by weight, and dried until the volatile material content is less than 1% by weight, thereby providing free-flowing, nontacky, elastomeric shaped objects.

10. The method of claim 9 in which the elastomer is neoprene and the inorganic oxide is polysilicic acid which has not aged for more than 90% of its gel time prior to being added to the bath.

11. The method of claim 10 in which the latex has a solids content of 35 to 50%, the latex is added as drops above the surface of the bath, and the pH of the bath is 2.5 to 5.5.

12. The method of claim 11 in which the bath contains 1 to 10% by weight of coagulating salt including 0.002 to 2% by weight of an ionizable salt of a metal selected from the group consisting of aluminum and yttrium, and 0.03 to 2% by weight of polysilicic acid which has aged 5 to 70% of its gel time prior to being added to the bath.

13. The method of claim 12 in which the washing step reduces the water soluble material content to less than 1% by weight, and the drying step reduces the volatile material content to less than 0.5% by weight.

14. A coagulating and coating bath which comprises,
(a) 0.5 to 25% by weight of a soluble coagulating salt for a normally tacky, uncured elastomer latex, and
(b) 0.01 to 5% by weight of a soluble or colloidally dispersed, hydrous, inorganic oxide selected from the group consisting of silicic acid polymers, aluminic acid polymers, silicic acid-aluminic acid copolymers, and mixtures thereof, said bath having a pH of 2 to 7 such that, when a drop of 1.0 N NaOH is added to the bath, the drop is immediately surrounded by a cloudy coating of gelled, hydrous inorganic oxide.

15. The bath of claim 14 in which the bath contains
(a) 1 to 10% by weight of coagulating salt including 0.002 to 2% by weight of an ionizable salt of a metal selected from the group consisting of aluminum and yttrium, and
(b) 0.03 to 2% by weight of inorganic oxide, and the pH of the bath is 2.5 to 5.5.

16. The bath of claim 15 in which the inorganic oxide is soluble.

17. The bath of claim 16 in which the inorganic oxide is polysilicic acid.

18. The bath of claim 15 in which the inorganic oxide is a colloidally dispersible sol.

19. The bath of claim 18 in which the colloidally dispersible sol is silica sol.

20. The bath of claim 17 which also contains sufficient compatible surfactant to reduce the air-liquid interfacial tension to less than 50 dynes/cm.

* * * * *